US011511608B1

(12) United States Patent
Jabaji

(10) Patent No.: US 11,511,608 B1
(45) Date of Patent: Nov. 29, 2022

(54) VEHICLE STRUT AND LIFTING DEVICE AND SYSTEM

(71) Applicant: Integrity Auto Group, Inc., Westminster, MD (US)

(72) Inventor: Jalil G. Jabaji, Westminster, MD (US)

(73) Assignee: Integrity Auto Group, Inc., Westminster, MD (US)

( * ) Notice: Subject to any disclaimer, the term of this patent is extended or adjusted under 35 U.S.C. 154(b) by 0 days.

(21) Appl. No.: 17/844,613

(22) Filed: Jun. 20, 2022

Related U.S. Application Data

(60) Provisional application No. 63/321,102, filed on Mar. 17, 2022.

(51) Int. Cl.
*B60J 7/12* (2006.01)

(52) U.S. Cl.
CPC ....................................... *B60J 7/12* (2013.01)

(58) Field of Classification Search
CPC .......................................................... B60J 7/12
USPC .... 296/100.17, 107.01, 121, 100.18, 107.16, 296/100.06, 100.1
See application file for complete search history.

(56) References Cited

U.S. PATENT DOCUMENTS

| 2,560,496 | A | * | 7/1951 | Vigmostad |
| 5,322,336 | A | * | 6/1994 | Isler |
| 5,782,522 | A | * | 7/1998 | DeBono |
| 6,295,713 | B1 | * | 10/2001 | Hilliard et al. |
| 6,322,130 | B1 | * | 11/2001 | Wanden et al. |
| 8,002,326 | B2 | * | 8/2011 | Neubrand |
| 9,045,026 | B2 | | 6/2015 | Bennett et al. |
| 9,944,155 | B2 | * | 4/2018 | Lewis et al. |
| 10,166,848 | B2 | | 1/2019 | Lewis et al. |

* cited by examiner

*Primary Examiner* — Joseph D. Pape
(74) *Attorney, Agent, or Firm* — Rahman LLC

(57) ABSTRACT

A dual acting gas strut system for a vehicle such as a sports utility vehicle that allows for easier and safer opening and closing of the soft top roof as well as the rear cargo access area. The gas strut attaches to the soft top frame using a ball stud or pin and clevis, at each end, the ball stud or pin and clevis, which is either attached directly to the soft top frame, or is attached to a bracket which attaches to the soft top frame. Alternatively, the gas strut only attaches to the soft top frame at one end and is attached to the vehicle at the other. Each end is attached using a ball stud or pin and clevis, which is either attached directly to the soft top frame or vehicle, or is attached to a bracket which, is attached to the soft top frame or vehicle.

20 Claims, 5 Drawing Sheets

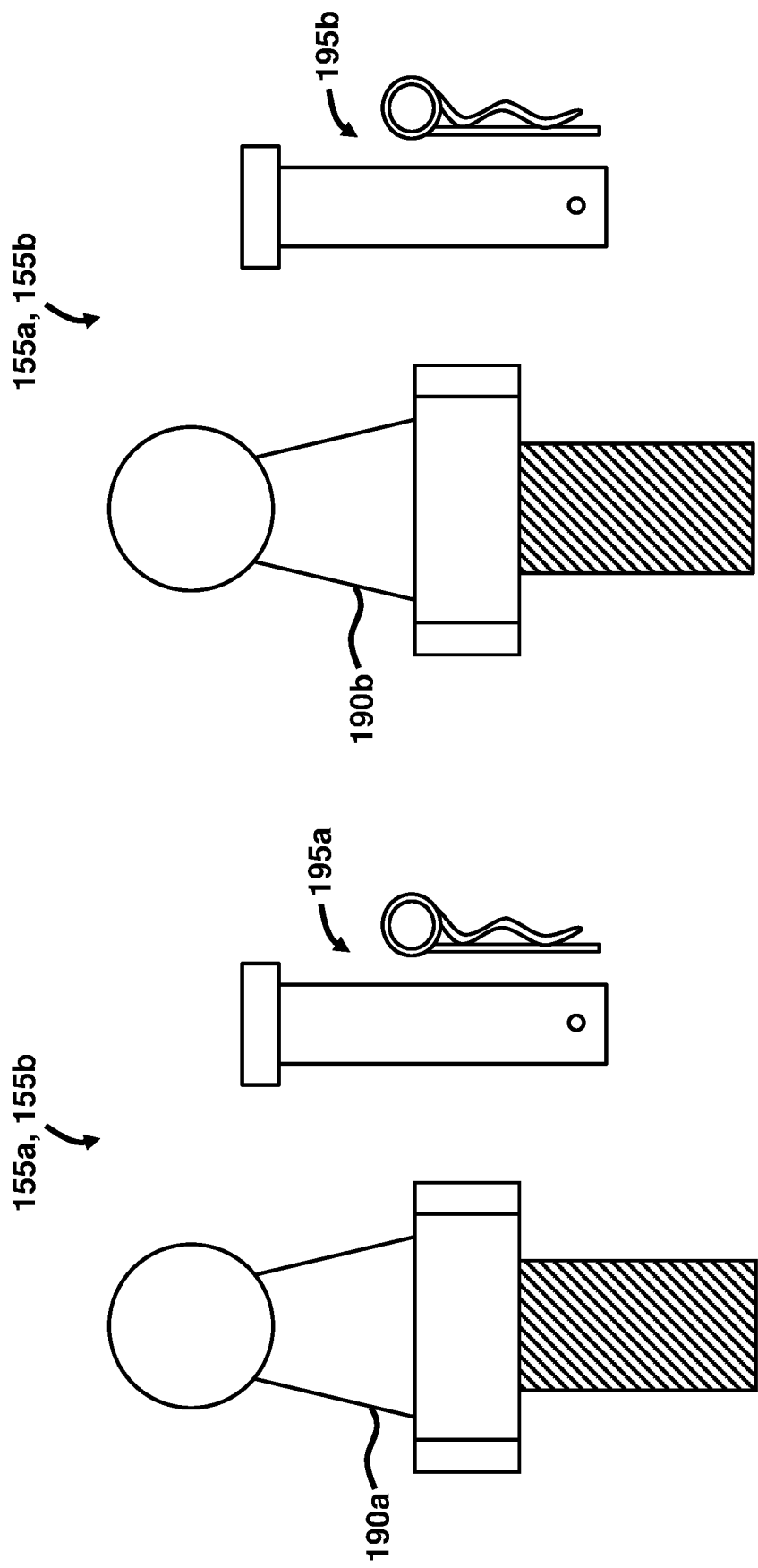

VEHICLE STRUT AND LIFTING DEVICE AND SYSTEM

CROSS-REFERENCE TO RELATED APPLICATIONS

This application claims priority to U.S. Patent Provisional Application No. 63/321,102 filed on Mar. 17, 2022, the complete disclosure of which, in its entirety, is hereby incorporated by reference.

BACKGROUND

Technical Field

The embodiments herein generally relate to automotive and vehicular components, and more particularly to, a strut device and system used to engage a soft top roof of a vehicle.

Description of the Related Art

Foldable soft tops are a common feature on many vehicles, especially in the Sports Utility Vehicle (SUV) market. Such vehicles usually offer a hard fixed top or an optional retractable soft top built on a metal framework. The idea being that the occupants of the vehicle are able to have a more enjoyable outside experience with the top folded back, whilst also being able to fold the top back up at a whim should weather or environmental conditions require it. However, often the tops can be very heavy or awkward to operate, especially by a single person. Often such tops require a minimum of two people to operate or perhaps need a single person to stand inside the vehicle to be able to overcome the heavy top when under the influence of gravity.

Additionally, the soft top frame may obstruct access to the rear cargo area of the vehicle, requiring part of the soft top frame to be moved out of the way, or in some instances removed entirely to grant access. On some vehicles where a section of the frame needs to be moved, there is then a need to hold it in place whilst access is granted—this again requires a second person to assist, or in some instances a mechanical prop, or lock, is used. Some patents related to this technology are U.S. Pat. No. 9,045,026 issued to Bennett et al. and U.S. Pat. No. 10,166,848 issued to Lewis et al. However, there remains a need for a new device and system to open/close vehicle soft tops safely and easily.

SUMMARY

In view of the foregoing, an embodiment herein provides a strut lifting system for a rear cargo soft top of a vehicle, the system comprising a first gas strut attached to a first side of a rear cargo section of the vehicle; and a second gas strut attached to a second side of the rear cargo section of the vehicle, wherein the second side is on a laterally opposite side of the vehicle from the first side, wherein each of the first gas strut and the second gas strut comprise a first end configured to operatively connect to the vehicle, and a second end configured to operatively connect to a soft top frame of the vehicle that supports the rear cargo soft top, and wherein each of the first gas strut and the second gas strut are configured to articulate in tandem (i) from a compressed position to a first extended position as the rear cargo soft top is lifted away from the vehicle, and (ii) from the first extended position to the compressed position as the rear cargo soft top is lowered towards the vehicle.

The system may comprise a first pivot connector to attach the first end of the first gas strut to the vehicle. The system may comprise a first pivot connector to attach the first end of the second gas strut to the vehicle. The system may comprise a bracket attached to the soft top frame; and a second pivot connector to pivotally attach the second end of the first gas strut to the bracket. The system may comprise a bracket attached to the soft top frame; and a second pivot connector to pivotally attach the second end of the second gas strut to the bracket. The first gas strut may be removable. The second gas strut may be removable.

Another embodiment provides a strut lifting system for a rear cargo soft top of a vehicle, the system comprising a first gas strut attached to a first side of a rear cargo section of the vehicle; and a second gas strut attached to a second side of the rear cargo section of the vehicle, wherein the second side is on a laterally opposite side of the vehicle from the first side, wherein each of the first gas strut and the second gas strut comprise a first end configured to operatively connect to a first portion of the soft top frame, and a second end configured to operatively connect to a second portion of the soft top frame of the vehicle that supports the rear cargo soft top, and wherein each of the first gas strut and the second gas strut are configured to articulate in tandem (i) from a compressed position to a first extended position as the rear cargo soft top is lifted away from the vehicle, and (ii) from the first extended position to the compressed position as the rear cargo soft top is lowered towards the vehicle.

The first portion of the soft top frame may be fixed to the vehicle. The second portion of the soft top frame may be movable with the rear cargo soft top. The first gas strut and the second gas strut may articulate from the compressed position to the first extended position and vice versa in a motion-controlled manner to reduce a speed and force associated with movement of the rear cargo soft top. The first gas strut and the second gas strut may articulate from the compressed position to the first extended position and vice versa in a motion-controlled manner and at an acceleration force less than gravity acting on the rear cargo soft top.

Another embodiment provides a strut lifting system for a rear cargo soft top of a vehicle, the system comprising a first gas strut attached to a first side of a soft top frame of a rear cargo section of the vehicle; and a second gas strut attached to a second side of the soft top frame of the rear cargo section of the vehicle, wherein the second side is on a laterally opposite side of the vehicle from the first side, wherein each of the first gas strut and the second gas strut comprise a first end configured to operatively connect to a first portion of the soft top frame, and a second end configured to operatively connect to a second portion of the soft top frame of the vehicle that supports the rear cargo soft top, and wherein each of the first gas strut and the second gas strut are configured to articulate in tandem (i) from a compressed position to a first extended position as the rear cargo soft top is lifted away from the vehicle, (ii) from the first extended position to a second extended position as the soft top frame is lifted away from the vehicle, (iii) from the second extended position to the first extended position as the soft top frame is lowered towards the vehicle, and (iv) from the first extended position to the compressed position as the rear cargo soft top is lowered towards the vehicle.

The first gas strut may be configured to attach to a first latch to control movement of the first gas strut. The second gas strut may be configured to attach to a second latch to control movement of the second gas strut. Each of the first gas strut and the second gas strut may be connected to a first pivot connector and a second pivot connector. The first pivot connector may comprise a ball stud. The first pivot connector may comprise a pin and clevis. The second pivot connector may comprise a ball stud. The second pivot connector may comprise a pin and clevis.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 are schematic diagrams illustrating different types of pivot connectors used in accordance with the embodiments herein.

DETAILED DESCRIPTION

Figure 1:
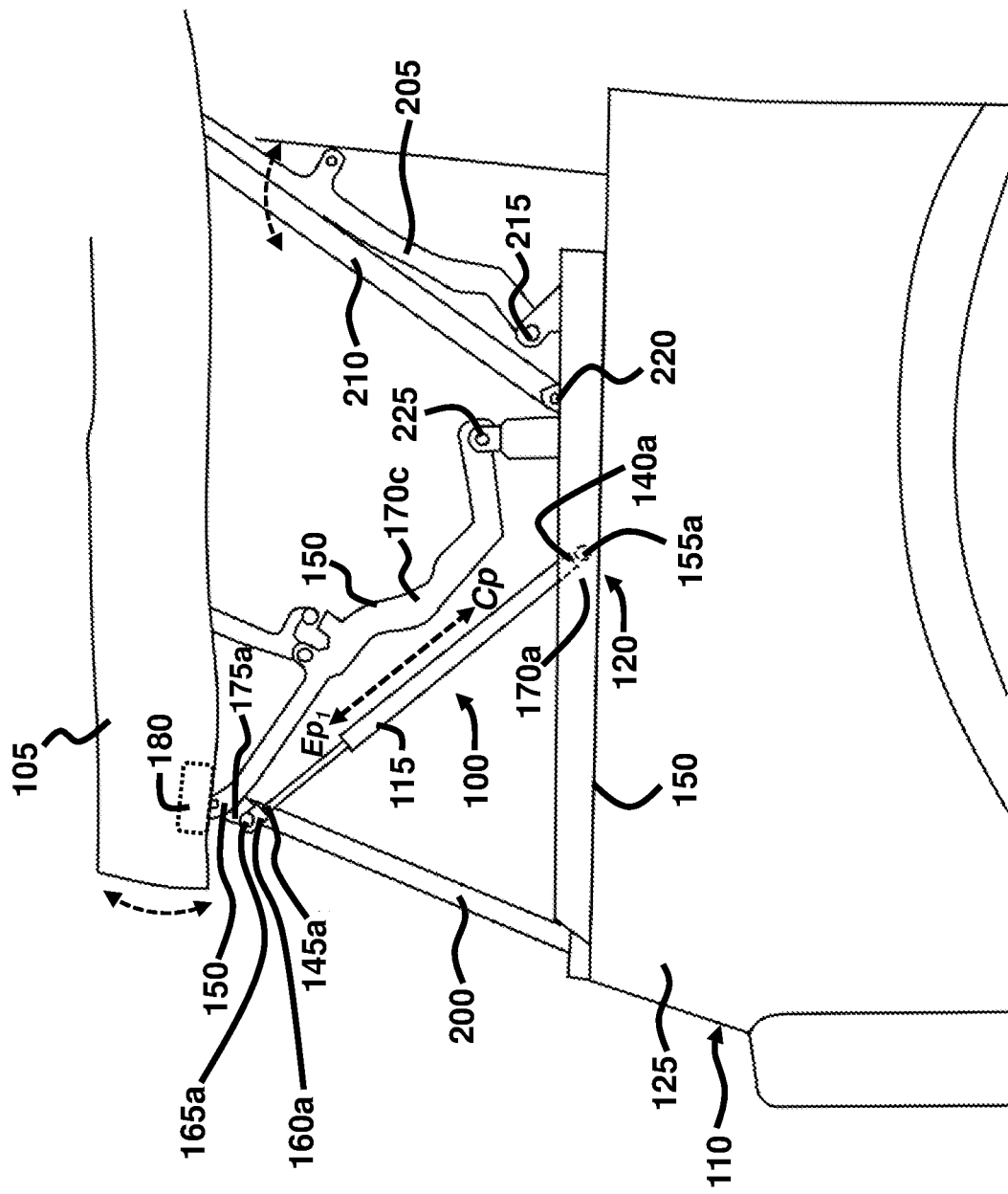
FIG. 1 is a schematic diagram illustrating a first side of a strut lifting system, according to an embodiment herein.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a dual acting gas strut system for a Sports Utility Vehicle (SUV) that allows for easier and safer opening and closing of the soft top roof, but also allows for easier and safer opening and closing of the rear cargo access area. The gas strut is attached to the soft top frame using a ball stud, or pin and clevis, at each end, the ball stud, or pin and clevis, which in turn is either attached directly to the soft top frame, or is attached to a bracket which, is in turn attached to the soft top frame. Alternatively, the gas strut is only attached to the soft top frame at one end and is attached to the vehicle body at the other again, each end is again attached using a ball stud, or pin and clevis, which in turn is either attached directly to the soft top frame or vehicle body, or is attached to a bracket which, is in turn attached to the soft top frame or vehicle body. One aspect of the embodiments herein is that no additional lock or latching mechanism is added to the vehicle, the operation of the system remains as before the gas strut system was installed. Referring now to the drawings, and more particularly to FIGS. 1 through 5, where similar reference characters denote corresponding features consistently throughout the figures, there are shown preferred embodiments. In the drawings, the size and relative sizes of components, layers, and regions, etc. may be exaggerated for clarity.

Figure 2:
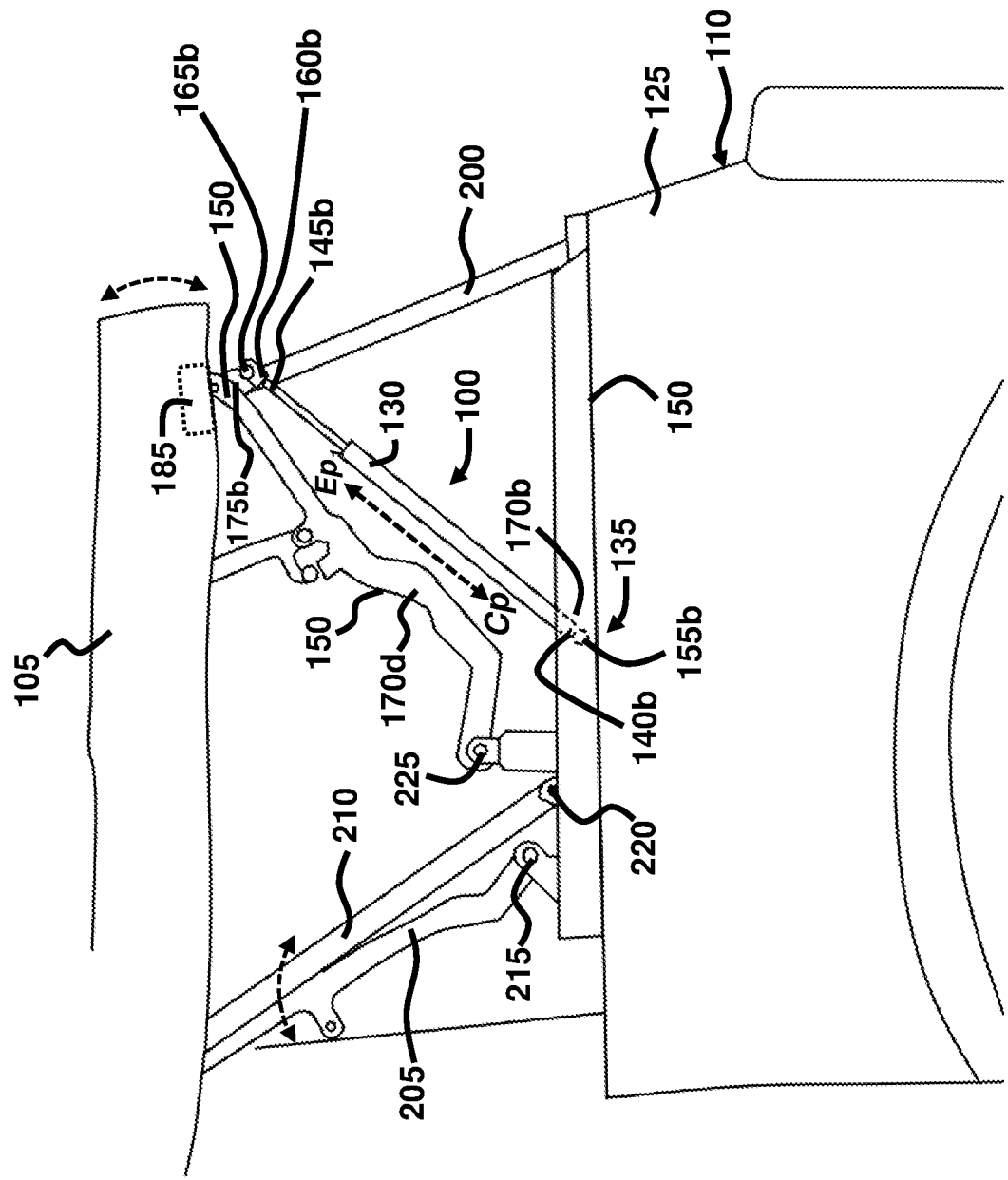
FIG. 2 is a schematic diagram illustrating a second side of a strut lifting system, according to an embodiment herein.

FIGS. 1 through 2 illustrate a strut lifting system 100 for a rear cargo soft top 105 of a vehicle 110. In an example, the rear cargo soft top 105 may comprise any suitable material used for vehicle soft tops such as canvas, twill, or vinyl. In an example, the vehicle 110 may comprise a SUV or other type of vehicle configured to have a rear cargo soft top 105. The system 100 comprises a first gas strut 115 attached to a first side 120 of a rear cargo section 125 of the vehicle 110. The system 100 further comprises a second gas strut 130 attached to a second side 135 of the rear cargo section 125 of the vehicle 110. The first gas strut 115 and the second gas strut 130 may be sufficiently configured to accommodate the weight of the rear cargo soft top 105 as well as any connected frame. For example, the first gas strut 115 and the second gas strut 130 may have weight tolerances between 20-150 lbs. and may be sized between 10-25 inches in length. The first gas strut 115 and the second gas strut 130 may each comprise a spring and shock absorber (not shown) in a tube/rod arrangement, which facilitates a compression/extension articulation of the first gas strut 115 and the second gas strut 130. Additionally, in an example, the first gas strut 115 and the second gas strut 130 have similar size and weight tolerances to ensure a uniform fit and movement. Moreover, the first gas strut 115 may be removable and the second gas strut 130 may be removable for installation, repair, and/or replacement purposes, etc.

In an example, the first side 120 of the rear cargo section 125 of the vehicle 110 may be the right side of the rear portion of the vehicle 110 and the second side 135 of the rear cargo section 125 of the vehicle 110 may be the left side of the rear portion of the vehicle 110. However, in other examples, the first side 120 may be left side of the vehicle 110 and the second side may be the right side of the vehicle 110. Nevertheless, the first side 120 and the second side 135 are on opposite sides of the vehicle 110. In other words, the second side 135 is on a laterally opposite side of the vehicle 110 from the first side 120. The rear cargo section 125 of the vehicle 110 may be used to store/transport items including passengers. Moreover, the rear cargo section 125 may be covered by the rear cargo soft top 105 such that the rear cargo soft top 105 is spaced apart from the bottom of the rear cargo section 125 to permit the items/passengers to be stored therein and still have headspace prior to the placement of the rear cargo soft top 105.

In an example, each of the first gas strut 115 and the second gas strut 130 comprise a first end 140a, 140b, respectively, configured to operatively connect to the vehicle 110, and a second end 145a, 145b, respectively, configured to operatively connect to a soft top frame 150 of the vehicle 110 that supports the rear cargo soft top 105. For example, the first gas strut 115 may comprise the first end 140a and the oppositely positioned second end 145a, while the second gas strut 130 may comprise the first end 140b and the oppositely positioned second end 145b. In this regard, the first end 140a is positioned at one end of the first gas strut 115 and the second end 145a is positioned at the opposite end of the first gas strut 115. Similarly, the first end 140b is positioned at one end of the second gas strut 130 and the second end 145b is positioned at the opposite end of the second gas strut 130. In an example, the soft top frame 150 may comprise a metal material and configured as one or more pivoting arms, rails, and longitudinal members to facilitate the full collapse of the rear cargo soft top 105. As such, the soft top frame 150 may include multiple sections and members that are pivotally or otherwise operatively connected together to form a framing system to support the rear cargo soft top 105. Some portions of the soft top frame 150 are fixed to the vehicle 110 while others are pivotally attached to the vehicle 110 and while still others are movable and not directly restrained by the vehicle 110.

The first gas strut 115 and the second gas strut 130 are not connected to each other either directly or indirectly through intermediate components. For example, there is no horizontal linking bar or other such mechanism connecting the first gas strut 115 to the second gas strut 130. Moreover, the first gas strut 115 and the second gas strut 130 are substantially linear, elongated mechanisms without any bends, curves or other non-linear components to define the overall shape and configuration of the first gas strut 115 and the second gas strut 130. Furthermore, each of the first gas strut 115 and the second gas strut 130 comprise a single elongated body (e.g., arm member). In other words, there are not multiple elongated arm members for each of the first gas strut 115 and the second gas strut 130 assembly. Each of the first gas strut 115 and the second gas strut 130 comprises a piston like configuration to extend/contract. In an example, the first portion 170*a*, 170*b* of the soft top frame 150 is the portion of the soft top frame 150 that is parallel to the ground and parallel to the top of the rear cargo soft top 105 when the rear cargo soft top 105 is in its in-use position at top of the vehicle 110. In this regard, the first portion 170*a*, 170*b* is not positioned at an angle with respect to the vehicle 110 or the ground.

Furthermore, each of the first gas strut 115 and the second gas strut 130 are configured to articulate in tandem (i) from a compressed position Cp to a first extended position $Ep_1$ as the rear cargo soft top 105 is lifted away from the vehicle 110, and (ii) from the first extended position $Ep_1$ to the compressed position Cp as the rear cargo soft top 105 is lowered towards the vehicle 110. In this regard, the tandem movement of the first gas strut 115 and the second gas strut 130 allow for a smooth and uniform lifting/stowing of the rear cargo soft top 105 as the first gas strut 115 and the second gas strut 130 articulate from the compressed position Cp to a first extended position $Ep_1$ and vice versa.

The system 100 may comprise a first pivot connector 155*a* to attach the first end 140*a* of the first gas strut 115 to the vehicle 110. Moreover, the system 100 may comprise a first pivot connector 155*b* to attach the first end 140*b* of the second gas strut 130 to the vehicle 110. The system 100 may further comprise a bracket 160*a* attached to the soft top frame 150. The system may further comprise a second pivot connector 165*a* to pivotally attach the second end 145*a* of the first gas strut 115 to the bracket 160*a*. The system 100 may also comprise a bracket 160*b* attached to the soft top frame 150. Moreover, the system 100 may further comprise a second pivot connector 165*b* to pivotally attach the second end 145*b* of the second gas strut 130 to the bracket 160*b*. In this regard, there may be a pair of first pivot connectors 155*a*, 155*b*, a pair of brackets 160*a*, 160*b*, and a pair of second pivot connectors 165*a*, 165*b* to facilitate the corresponding attachments of the first gas strut 115 to the vehicle 110 and to the soft top frame 150 as well as the corresponding attachments of the second gas strut 130 to the vehicle 110 and to the soft top frame 150.

FIGS. 1 through 2 also illustrate a strut lifting system 100 for a rear cargo soft top 105 of a vehicle 110. The system 100 comprises a first gas strut 115 attached to a first side 120 of a rear cargo section 125 of the vehicle 110. The system 100 further comprises a second gas strut 130 attached to a second side 135 of the rear cargo section 125 of the vehicle 110. The second side 135 is on a laterally opposite side of the vehicle 110 from the first side 120. Each of the first gas strut 115 and the second gas strut 130 comprise a first end 140*a*, 140*b* configured to operatively connect to a first portion 170*a*, 170*b* of the soft top frame 150, and a second end 145*a*, 145*b* configured to operatively connect to a second portion 175*a*, 175*b* of the soft top frame 150 of the vehicle 110 that supports the rear cargo soft top 105. In an example, the first portion 170*a*, 170*b* of the soft top frame 150 may be positioned on the upper side of the rear cargo section 125. Moreover, the second portion 175*a*, 175*b* of the soft top frame 150 may be positioned near where the rear cargo soft top 105 attaches to the bracket 160*a*, 160*b* and corresponding second pivot connector 165*a*, 165*b*.

The first gas strut 115 and the second gas strut 130 are not connected to each other either directly or indirectly through intermediate components. For example, there is no horizontal linking bar or other such mechanism connecting the first gas strut 115 to the second gas strut 130. Moreover, the first gas strut 115 and the second gas strut 130 are substantially linear, elongated mechanisms without any bends, curves or other non-linear components to define the overall shape and configuration of the first gas strut 115 and the second gas strut 130. Furthermore, each of the first gas strut 115 and the second gas strut 130 comprise a single elongated body (e.g., arm member). In other words, there are not multiple elongated arm members for each of the first gas strut 115 and the second gas strut 130 assembly. Each of the first gas strut 115 and the second gas strut 130 comprises a piston like configuration to extend/contract. In an example, the first portion 170*a*, 170*b* of the soft top frame 150 is the portion of the soft top frame 150 that is parallel to the ground and parallel to the top of the rear cargo soft top 105 when the rear cargo soft top 105 is in its in-use position at top of the vehicle 110. In this regard, the first portion 170*a*, 170*b* is not positioned at an angle with respect to the vehicle 110 or the ground.

Each of the first gas strut 115 and the second gas strut 130 are configured to articulate in tandem (i) from a compressed position Cp to a first extended position $Ep_1$ as the rear cargo soft top 105 is lifted away from the vehicle 110, and (ii) from the first extended position $Ep_1$ to the compressed position Cp as the rear cargo soft top 105 is lowered towards the vehicle 110. In an example, the first gas strut 115 and the second gas strut 130 may first be in a compressed position Cp and then move in tandem to the first extended position $Ep_1$. In another example, the first gas strut 115 and the second gas strut 130 may first be in the first extended position $Ep_1$ and then move in tandem to the compressed position Cp. However, the first gas strut 115 and the second gas strut 130 always move in tandem; i.e., they are both in the compressed position Cp at the same time, or are both in the first extended position $Ep_1$ at the same time, or are in some stage of movement at the same position as each other.

According to an example, the first portion 170*a*, 170*b* of the soft top frame 150 may be fixed to the vehicle 110. In another example, the first portion 170*a*, 170*b* of the soft top frame 150 may be pivotally attached to the vehicle 110. Furthermore, the second portion 175*a*, 175*b* of the soft top frame 150 may be movable with the rear cargo soft top 105. In other words, as the rear cargo soft top 105 is lifted/ lowered based on the extension/compression of the first gas strut 115 and the second gas strut 130, the second portion 175*a*, 175*b* of the soft top frame 150 may move along with the corresponding movement of the rear cargo soft top 105. In an example, the extension of the first gas strut 115 and the second gas strut 130 permit the second portion 175a, 175b of the soft top frame 150 and connected rear cargo soft top 105 to be lifted away from the vehicle 110 while the first gas strut 115 and the second gas strut 130 are attached to the first portion 170a, 170b of the soft top frame 150.

The first gas strut 115 and the second gas strut 130 may articulate from the compressed position Cp to the first extended position $Ep_1$ and vice versa in a motion-controlled manner to reduce a speed and force associated with movement of the rear cargo soft top 105. This motion-controlled aspect of moving the rear cargo soft top 105 is a unique safety feature offered by the embodiments herein to prevent an unexpected quick drop of the rear cargo soft top 105 onto a user of the system 100, a passenger in the rear cargo section 125, or items stored in the rear cargo section 125, or a combination thereof. The first gas strut 115 and the second gas strut 130 may articulate from the compressed position Cp to the first extended position $Ep_1$ and vice versa in a motion-controlled manner and at an acceleration force less than gravity acting on the rear cargo soft top 105. This prevents the rear cargo soft top 105 and the second portion 175a, 175b of the soft top frame 150 from quickly and possibly dangerously slamming down into/onto the rear cargo section 125 of the vehicle 110, thereby preventing injury to a passenger (or user of the system 100) or damage to items stored in the rear cargo section 125.

FIGS. 1 through 4 also illustrate a strut lifting system 100 for a rear cargo soft top 105 of a vehicle 110. The system 100 comprises a first gas strut 115 attached to a first side 120 of a soft top frame 150 of a rear cargo section 125 of the vehicle 110. The system 100 further comprises a second gas strut 130 attached to a second side 135 of the soft top frame 150 of the rear cargo section 125 of the vehicle 110. The second side 135 is on a laterally opposite side of the vehicle 110 from the first side 120. Each of the first gas strut 115 and the second gas strut 130 comprise a first end 140a, 140b configured to operatively connect to a first portion 170a, 170b of the soft top frame 150, and a second end 145a, 145b configured to operatively connect to a second portion 175a, 175b of the soft top frame 150 of the vehicle 110 that supports the rear cargo soft top 105.

The first gas strut 115 and the second gas strut 130 are not connected to each other either directly or indirectly through intermediate components. For example, there is no horizontal linking bar or other such mechanism connecting the first gas strut 115 to the second gas strut 130. Moreover, the first gas strut 115 and the second gas strut 130 are substantially linear, elongated mechanisms without any bends, curves or other non-linear components to define the overall shape and configuration of the first gas strut 115 and the second gas strut 130. Furthermore, each of the first gas strut 115 and the second gas strut 130 comprise a single elongated body (e.g., arm member). In other words, there are not multiple elongated arm members for each of the first gas strut 115 and the second gas strut 130 assembly. Each of the first gas strut 115 and the second gas strut 130 comprises a piston like configuration to extend/contract. In an example, the first portion 170a, 170b of the soft top frame 150 is the portion of the soft top frame 150 that is parallel to the ground and parallel to the top of the rear cargo soft top 105 when the rear cargo soft top 105 is in its in-use position at top of the vehicle 110. In this regard, the first portion 170a, 170b is not positioned at an angle with respect to the vehicle 110 or the ground.

Figure 3:
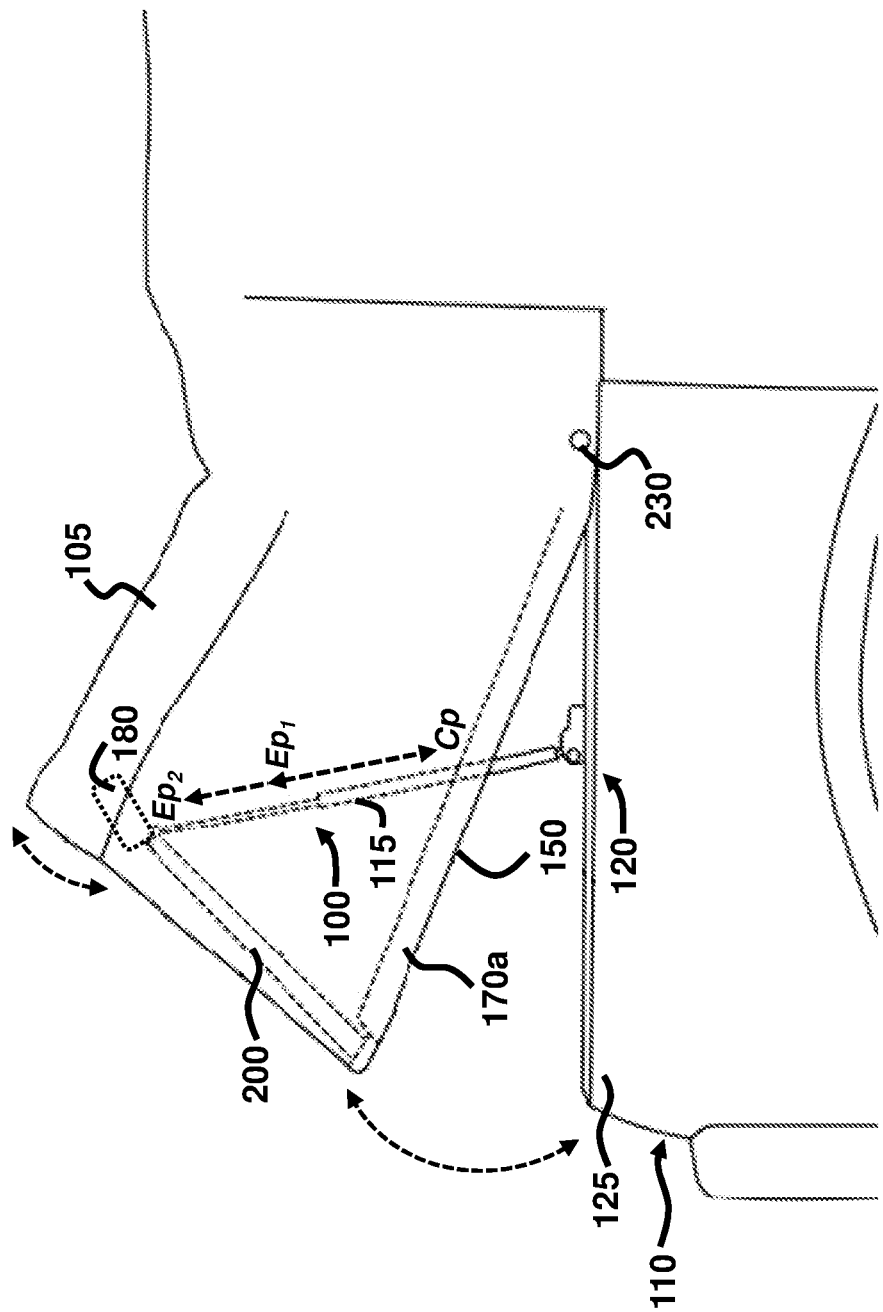
FIG. 3 is a schematic diagram illustrating a first side of a strut lifting system in a lifting position, according to an embodiment herein.
Figure 4:
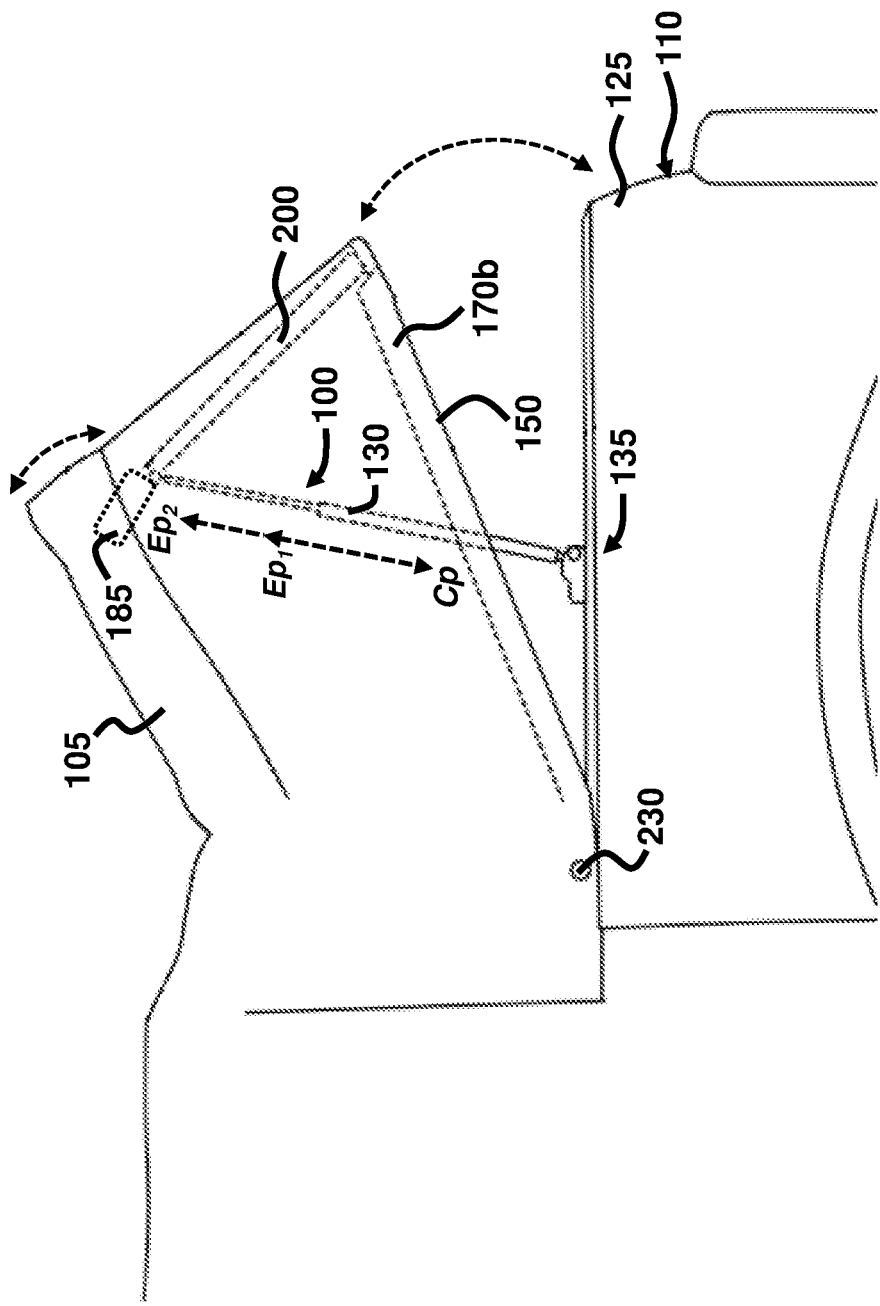
FIG. 4 is a schematic diagram illustrating a second side of a strut lifting system in a lifting position, according to an embodiment herein.

As shown in FIGS. 3 and 4, each of the first gas strut 115 and the second gas strut 130 are configured to articulate in tandem (i) from a compressed position Cp to a first extended position $Ep_1$ as the rear cargo soft top 105 is lifted away from the vehicle 110, (ii) from the first extended position $Ep_1$ to a second extended position $Ep_2$ as the soft top frame 150 is lifted away from the vehicle 110, (iii) from the second extended position $Ep_2$ to the first extended position $Ep_1$ as the soft top frame 150 is lowered towards the vehicle 110, and (iv) from the first extended position $Ep_1$ to the compressed position Cp as the rear cargo soft top 105 is lowered towards the vehicle 110. In this regard, the first gas strut 115 and the second gas strut 130 may have multiple extension positions (e.g., first extended position $Ep_1$ and the second extended position $Ep_2$) in addition to the compressed position Cp. According to an example, the travel (i.e., extension) of the first gas strut 115 and the second gas strut 130 is almost split in half—the first half of the first gas strut 115 and the second gas strut 130 travel (e.g., first extended position $Ep_1$) is responsible for the raising and lowering of the first extended position $Ep_1$, while the next half of the travel (e.g., second extended position $Ep_2$) is responsible for the raising and lowering of the rear cargo access (e.g., rear cargo section 125). This dual action extension (e.g., first extended position $Ep_1$ and second extended position $Ep_2$) using a single gas strut (e.g., first gas strut 115 and the second gas strut 130) on each side (first side 120 and second side 135) of the vehicle 110 is an unusual and novel aspect of the embodiments herein.

The first gas strut 115 may be configured to attach to a first latch 180 to control movement of the first gas strut 115. Moreover, the second gas strut 130 may be configured to attach to a second latch 185 to control movement of the second gas strut 130. The first latch 180 and the second latch 185 may be positioned adjacent to the second portion 175a, 175b of the soft top frame 150 of the vehicle 110 that supports the rear cargo soft top 105. Moreover, the first latch 180 and the second latch 185 may be configured as push/pull latches or as any other suitable type of latch that locks/unlocks the movement of the first gas strut 115 and the second gas strut 130. In an example, a user would unlock both the first latch 180 and the second latch 185 in tandem or one right after the other so as to ensure the tandem movements of the first gas strut 115 and the second gas strut 130. Nonetheless, the strength tolerances of the first gas strut 115 and the second gas strut 130 are configured to have a factor of safety much greater than the weight of the rear cargo soft top 105 such that if one of the latches are locked while the other latch is unlocked (e.g., only the first latch 180 is unlocked while the second latch 185 remains locked (in an example)), the corresponding locked gas strut (e.g., the second gas strut 130 in this example) is able to maintain its orientation to sustain the rear cargo soft top 105 in position. However, to ensure a smooth movement of the first gas strut 115 and the second gas strut 130 as well as a corresponding smooth movement of the rear cargo soft top 105 in a controlled and safe manner as well as to not unnecessarily strain one of the gas struts, it is desirable to have both the first latch 180 and the second latch 185 locked/unlocked simultaneously or as close to simultaneously as possible. In another example, each of the first gas strut 115 and the second gas strut 130 may comprise their own separate locking mechanism (not shown) to provide a secondary locking/unlocking mechanism to further facilitate a controlled motion of the extension/compression of the first gas strut 115 and the second gas strut 130.

Each of the first gas strut 115 and the second gas strut 130 may be connected to a first pivot connector 155a, 155b and a second pivot connector 165a, 165b. As shown in the examples of FIG. 5, the first pivot connector 155a, 155b may comprise a ball stud 190a. The first pivot connector 155a, 155b may comprise a pin and clevis 195a. The second pivot connector 165a, 165b may comprise a ball stud 190b. The second pivot connector 165a, 165b may comprise a pin and clevis 195b. However, other suitable types of pivot connectors may be used in accordance with the embodiments herein.

The embodiments herein may be used for SUVs or other vehicles 110 having a soft top 105. From the factory the soft top 105 has a number of problems that can be improved upon: (1) The soft top frame 150 is very heavy, being difficult for one person to put up or down by themselves, often requiring at least two people; (2) As well as being heavy the soft top frame 150 is not very rigid—when one person lifts the top it can move sideways, this can result in rubbing or scratching of the paint on the vehicle 110; (3) The soft top frame 150 may partially block access to the rear cargo section 125 of the vehicle 110, and to allow access the soft top lower frame section (e.g., second portion 175a, 175b of the soft top frame 150) can pivot up out of the way—however this is heavy and requires a physical prop to keep it up out of the way.

The vehicle strut soft top assist system 100 provided by the embodiments herein is a dual acting, add on system that serves multiple purposes: (1) Assists with putting the soft top 105 up through extension of the gas struts 115, 130; (2) Assists with lowering the soft top 105 by compressing the gas struts 115, 130; (3) Keeps the soft top frame 150 more rigid throughout its travel, resulting in no rubbing or scratching of the vehicle 110; (4) Assists with raising the soft top lower frame section (e.g., second portion 175a, 175b of the soft top frame 150) through extension of the gas struts 115, 130 resulting in easy access to the rear cargo section 125; (5) Assists with lowering of the soft top lower frame section (e.g., second portion 175a, 175b of the soft top frame 150) using compression of the gas struts 115, 130, resulting in soft and controlled closing.

In terms of installation of the system 100 into the vehicle 110: (1) There are no permanent modifications that have to be made to the vehicle 110; (2) The first pivot connector 155a, 155b and the second pivot connector 165a, 165b are installed on each side of the vehicle 110 using existing factory holes; (3) The strut lift system 100 can be removed at any point in time to return the vehicle 110 to stock; (4) The second pivot connector 165a, 165b may attach to the movable upper section (e.g., second portion 175a, 175b) of the soft top frame 150; (5) The first pivot connector 155a, 155b may attach to the fixed lower section (e.g., first portion 170a, 170b) of the soft top frame 150 or to the vehicle 110 itself.

According to an example, for installation, the first gas strut 115 and the second gas strut 130 are positioned on each side (e.g., first side 120 and second side 135) of the vehicle 110. The first gas strut 115 and the second gas strut 130 are attached to the soft top frame 150 using the first pivot connector 155a, 155b and the second pivot connector 165a, 165b. The second pivot connector 165a, 165b connects to or has an integrated bracket 160a, 160b that attaches to the second portion 175a, 175b of the soft top frame 150 utilizing an existing bolt hole (not shown) where a factory installed canvas strap 200 (shown in FIGS. 1 through 4) is attached. Both of the first pivot connector 155a, 155b and the second pivot connector 165a, 165b, and any bracket 160a, 160b that is part of the assembly of the first pivot connector 155a, 155b and the second pivot connector 165a, 165b attach to the first portion 170a, 170b and the second portion 175a, 175b of the soft top frame 150 using existing factory provided holes. As such, no additional holes are needed in the vehicle 110 for installation of the system 100. As a result, the strut lifting system 100 provided by the embodiments herein can be removed at any time.

Some conventional systems for other vehicles require the use of a pair of gas struts, either on one or both sides of the vehicle, to achieve similar purposes using them in a push/pull arrangement, but a novel aspect of the embodiments herein is using a single gas strut (e.g., the first gas strut 115 and the second gas strut 130) on each respective side 120, 135 of the vehicle 110 (i.e., one gas strut on each side of the vehicle 110) to achieve the dual functionality.

With respect to FIGS. 1 through 4, when lowering the rear cargo soft top 105, the forward soft top frame section 205 and the middle soft top frame section 210 swing backwards (towards the rear of the vehicle 110), pivoting about their respective lower pivots 215, 220, until the weight of the forward soft top frame section 205 and the middle soft top frame section 210, and the weight of the rear cargo soft top 105 is on the soft top frame 150, which then pivots around the fixed lower pivot 225. Without the strut lifting system 100 of the embodiments herein, the first portion 170a, 170b of the soft top frame 150 would drop down onto the second portion 175a, 175b of the soft top frame 150 under the full force of gravity. Conversely, with the strut lifting system 100 of the embodiments herein installed once the weight of the first portion 170a, 170b of the soft top frame 150 is on the third portion 170c, 170d of the soft top frame 150, the first gas strut 115 and the second gas strut 130 then support the weight, stopping the soft top frame 150 and rear cargo soft top 105 from dropping down under the full force of gravity, instead the first gas strut 115 and the second gas strut 130 pivots around the first pivot connector 155a, 155b and slows the descent of the rear cargo soft top 105 as it is compressed, reducing its installed length, and thus reducing the effective weight of the rear cargo soft top 105.

When raising the rear cargo soft top 105 from its down position, the soft top frame sections (e.g., third portion 170c, 170d of the soft top frame 150; the forward soft top frame section 205; and the middle soft top frame section 210) all pivot back up into their extended/raised positions. Without the strut lifting assist system 100 of the embodiments herein, the vehicle operator must lift the entire weight of the soft top frame 150 and rear cargo soft top 105 against gravity. This is very heavy and often requires two or more people. Conversely, with the strut lifting assist system 100 of the embodiments herein, when the vehicle operator lifts the soft top frame 150, the first gas strut 115 and the second gas strut 130 assist the lifting process by extending their length thus reducing the effective weight of the rear cargo soft top 105.

With respect to raising the rear cargo access (e.g., rear cargo section 125), when lifting the first portion 170a, 170b of the soft top frame 150, the first portion 170a, 170b of the soft top frame 150 pivots around a fixed point 230. This allows for better access to the rear cargo section 125. Without the strut lifting assist system 100 provided by the embodiments herein, the vehicle operator must lift the weight of the soft top frame 150 against the pull of gravity, and then must install a metal "prop" (not shown) of some sort in order to hold the rear cargo soft top 105 up and in place, allowing access to the rear cargo area. Conversely, with the strut lifting assist system 100 provided by the embodiments herein installed, as soon as the operator releases the soft top rear cargo access latches (e.g., first latch 180 and second latch 185) the force of the first gas strut 115 and the second gas strut 130 extension lifts up the rear cargo soft top 105, which then in turn lifts the first portion 170a, 170b of the soft top frame 150 via the factory installed canvas strap 200. This causes the first portion 170a, 170b of the soft top frame 150 to lift upwards automatically. An added feature is that the vehicle operator no longer needs to use the factory installed "prop" to support the first portion 170a, 170b of the soft top frame 150.

With regards to lowering the rear cargo access (e.g., rear cargo section 125), without the strut lifting assist system 100 provided by the embodiments herein to lower the first portion 170a, 170b of the soft top frame 150 the vehicle operator has to lift the rear cargo soft top 105 slightly against the pull of gravity, remove the "prop", and then lower the rear cargo soft top 105 down whilst under the pull of gravity. This can then slam down against the vehicle 110, before latching into place using the first latch 180 and the second latch 185. Conversely, with the strut lifting assist system 100 provided by the embodiments herein installed the first gas strut 115 and the second gas strut 130 support the weight of the rear cargo soft top 105 fully against the pull of gravity. The vehicle operator then just has to push down on the first portion 170a, 170b of the soft top frame 150 in order to bring the rear cargo soft top 105 low enough to latch into place with the first latch 180 and the second latch 185.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A strut lifting system for a rear cargo soft top of a vehicle, the system comprising:
   a first gas strut attached to a first side of a rear cargo section of the vehicle;
   a second gas strut attached to a second side of the rear cargo section of the vehicle, wherein the second side is on a laterally opposite side of the vehicle from the first side; and
   a first pivot member, a second pivot member, and a third pivot member, all of which are attached to a soft top frame of the vehicle that supports the rear cargo soft top,
   wherein each of the first gas strut and the second gas strut comprise a first end configured to operatively connect to the vehicle, and a second end configured to operatively connect to the soft top frame,
   wherein each of the first gas strut and the second gas strut are configured to articulate in tandem (i) from a compressed position to a first extended position as the rear cargo soft top is lifted away from the vehicle, and (ii) from the first extended position to the compressed position as the rear cargo soft top is lowered towards the vehicle,
   wherein the soft top frame is attached to the rear cargo soft top and to the first pivot member,
   wherein the soft top frame comprises:
      a forward soft top frame section attached to the second pivot member; and
      a middle soft top frame section attached to the third pivot member,
   wherein when lowering the rear cargo soft top, the forward soft top frame section and the middle soft top frame section swing backwards towards the rear cargo section of the vehicle, pivoting about the second pivot member and the third pivot member respectively, until a weight of the forward soft top frame section and the middle soft top frame section, and a weight of the rear cargo soft top is on the soft top frame causing the soft top frame to pivot on the first pivot member.

2. The system of claim 1, comprising a first pivot connector to attach the first end of the first gas strut to the vehicle.

3. The system of claim 1, comprising a first pivot connector to attach the first end of the second gas strut to the vehicle.

4. The system of claim 1, comprising:
   a bracket attached to the soft top frame; and
   a second pivot connector to pivotally attach the second end of the first gas strut to the bracket.

5. The system of claim 1, comprising:
   a bracket attached to the soft top frame; and
   a second pivot connector to pivotally attach the second end of the second gas strut to the bracket.

6. The system of claim 1, wherein the first gas strut is removable.

7. The system of claim 1, wherein the second gas strut is removable.

8. A strut lifting system for a rear cargo soft top of a vehicle, the system comprising:
   a single first gas strut attached to a first side of a rear cargo section of the vehicle; and
   a single second gas strut attached to a second side of the rear cargo section of the vehicle, wherein the second side is on a laterally opposite side of the vehicle from the first side,
   wherein each of the first gas strut and the second gas strut comprise a first end configured to operatively connect to a first portion of a soft top frame, and a second end configured to operatively connect to a second portion of the soft top frame that supports the rear cargo soft top, and
   wherein each of the first gas strut and the second gas strut are configured to articulate in tandem (i) from a compressed position to a first extended position as the rear cargo soft top is lifted away from the vehicle, and (ii) from the first extended position to the compressed position as the rear cargo soft top is lowered towards the vehicle.

9. The system of claim 8, wherein the first portion of the soft top frame is fixed to the vehicle.

10. The system of claim 8, wherein the second portion of the soft top frame is movable with the rear cargo soft top.

11. The system of claim 8, wherein the first gas strut and the second gas strut articulate from the compressed position to the first extended position and vice versa in a motion-controlled manner to reduce a speed and force associated with movement of the rear cargo soft top.

12. The system of claim 8, wherein the first gas strut and the second gas strut articulate from the compressed position to the first extended position and vice versa in a motion-controlled manner and at an acceleration force less than gravity acting on the rear cargo soft top.

13. A strut lifting system for a rear cargo soft top of a vehicle, the system comprising:
- a single first gas strut attached to a first side of a soft top frame of a rear cargo section of the vehicle; and
- a single second gas strut attached to a second side of the soft top frame of the rear cargo section of the vehicle, wherein the second side is on a laterally opposite side of the vehicle from the first side,
- wherein each of the first gas strut and the second gas strut comprise a first end configured to operatively connect to a first portion of the soft top frame, and a second end configured to operatively connect to a second portion of the soft top frame that supports the rear cargo soft top, and
- wherein each of the first gas strut and the second gas strut are configured to articulate in tandem (i) from a compressed position to a first extended position as the rear cargo soft top is lifted away from the vehicle, (ii) from the first extended position to a second extended position as the soft top frame is lifted away from the vehicle, (iii) from the second extended position to the first extended position as the soft top frame is lowered towards the vehicle, and (iv) from the first extended position to the compressed position as the rear cargo soft top is lowered towards the vehicle.

14. The system of claim 13, wherein the first gas strut is configured to operatively connect to a first latch to control movement of the first gas strut.

15. The system of claim 13, wherein the second gas strut is configured to operatively connect to a second latch to control movement of the second gas strut.

16. The system of claim 13, wherein each of the first gas strut and the second gas strut are connected to a first pivot connector and a second pivot connector.

17. The system of claim 16, wherein the first pivot connector comprises a ball stud.

18. The system of claim 16, wherein the first pivot connector comprises a pin and clevis.

19. The system of claim 16, wherein the second pivot connector comprises a ball stud.

20. The system of claim 16, wherein the second pivot connector comprises a pin and clevis.

* * * * *